(12) United States Patent
Kim

(10) Patent No.: US 7,764,333 B2
(45) Date of Patent: Jul. 27, 2010

(54) LIQUID CRYSTAL DISPLAY DEVICE

(75) Inventor: Yong Sang Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 226 days.

(21) Appl. No.: 11/644,554

(22) Filed: Dec. 22, 2006

(65) Prior Publication Data
US 2008/0002093 A1    Jan. 3, 2008

(30) Foreign Application Priority Data
Jun. 30, 2006    (KR)    .................... 10-2006-0060069

(51) Int. Cl.
*G02F 1/1333*    (2006.01)
(52) U.S. Cl. ....................... 349/58
(58) Field of Classification Search .................... 349/58
See application file for complete search history.

(56) References Cited

U.S. PATENT DOCUMENTS 6,975,368 B2 * 12/2005 Lee ............................. 349/58

2005/0146650 A1 * 7/2005 Chung et al. .................. 349/58

FOREIGN PATENT DOCUMENTS

KR    10-2006-0062051    6/2006

OTHER PUBLICATIONS

Office Action issued in corresponding Korean Patent Application No. 10-2006-0060069; issued Nov. 25, 2009.

* cited by examiner

*Primary Examiner*—Sarah Song
(74) *Attorney, Agent, or Firm*—Brinks Hofer Gilson & Lione

(57) ABSTRACT

A liquid crystal display device includes a liquid crystal panel firmly fixed to a support main. The liquid crystal display device includes a support main receiving a back light assembly, a liquid crystal panel positioned in the support main and located on the back light assembly, and a fixation member engaged with the support main and fixing the liquid crystal panel with respect to the support main.

5 Claims, 7 Drawing Sheets

LIQUID CRYSTAL DISPLAY DEVICE

CROSS-REFERENCE TO RELATED APPLICATIONS

This application claims the benefit of Korean Patent Application No. 10-2006-0060069, filed on Jun. 30, 2006, in the Korean Intellectual Property Office, the disclosure of which is incorporated herein by reference.

BACKGROUND

1. Technical Field

The present disclosure relates to a liquid crystal display device and more particularly to a liquid crystal display device including a support main to which a liquid crystal panel is fixed.

2. Discussion of the Related Art

A CRT (Cathode Ray Tube) is a general display device that is often used as a monitor for devices such as a measuring device, an information terminal device, and a TV. CRTs are generally relatively bulky and heavy, which eliminates the ability to make electronic devices that use CRTs with relatively small dimensions and light weight.

Liquid crystal display devices are normally smaller and weigh less than CRT devices with the same display size. LCDs also normally consume relatively little electrical power during operation. Liquid crystal display devices use thin film transistors that provide a high definition picture and the color quality displayed on LCDs are as good, if not better than CRTs. Additionally, liquid crystal display devices may be used with as large sized display devices. Liquid crystal display devices are often used as display devices for machines such as notebook computers, desk-top computers, and televisions.

Liquid crystal display devices include a liquid crystal panel displaying an image, a driving circuit for driving the liquid crystal panel, and a back light assembly providing light required for operation of the liquid crystal panel. The components of the liquid crystal display devices are stacked into a support main housing. A driving circuit is attached to the rear surface of the back light assembly. The structure of the liquid crystal display device is shown in FIGS. 1-2 that depict a conventional small-sized liquid crystal display device.

FIG. 1 is an exploded perspective view of a conventional small-sized liquid crystal display device and FIG. 2 is a cross-sectional view taken along line I-I' of FIG. 1. The conventional small-sized liquid crystal display device includes an FPC (flexible printed circuit) with a driving circuit for driving a liquid crystal panel 10 and a back light assembly 20 providing a flat surface light to the liquid crystal panel 10.

The back light assembly 20 includes a support main 70 receiving a light emitting diode 60, a printed circuit board 61, optical sheets 40, a light guide plate 50, and a reflection plate 80. A bottom cover 90 is combined with the support main 20 to enclose the above components. A light shielding tape 30 is attached to the support main 70 to fix the light emitting diode 60, the printed circuit board 61, the optical sheets 40, the light guide plate 50, and the reflection plate 80.

The liquid crystal panel 10 may be mounted to the light shielding tape 30 is fixed to the back light assembly 20 with an adhesive coated on the light shielding tape 30. The FPC 11 connected to the liquid crystal panel 10 is bent by approximately 180 degrees and aligned with a hole 91 formed on the rear surface of the bottom cover 90. Since the FPC 11 is formed at least partially from an aluminum wire, the FPC 11 has a predetermined resilient force. The resilient force generates a repulsive force by which the FPC 11 is urged to return to its original planar state. The repulsive force generated by the biasing force of the FPC 11 may be applied to the liquid crystal panel 10.

However, in the conventional small-sized liquid crystal display device, the liquid crystal panel 10 that is fixed to the liquid crystal panel 10 only by the bonding force of the light shielding tape 30 may cause a connection portion of the FPC 11 to protrude outward from the device due to a repulsive force on the FPC 11 in the direction of the arrow shown in FIG. 2. The protruding liquid crystal panel 10 may be damaged during an impact inspecting process or when roughly handled, thereby increasing the defect rate. Further, the protruding liquid crystal panel 10 allows light to leak from the panel.

SUMMARY OF THE INVENTION

A representative embodiment of a liquid crystal display device includes a support main receiving a back light assembly, a liquid crystal panel positioned in the support main and located on the back light assembly, and a fixation member engaged with the support main and urging and fixing the liquid crystal panel.

Additional advantages, objects, and features will be set forth in part in the description which follows and in part will become apparent to those having ordinary skill in the art upon examination of the following or may be learned from practice of the disclosure. The objectives and other advantages of the disclosed embodiments may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION OF PREFERRED EMBODIMENTS

Figure 1:
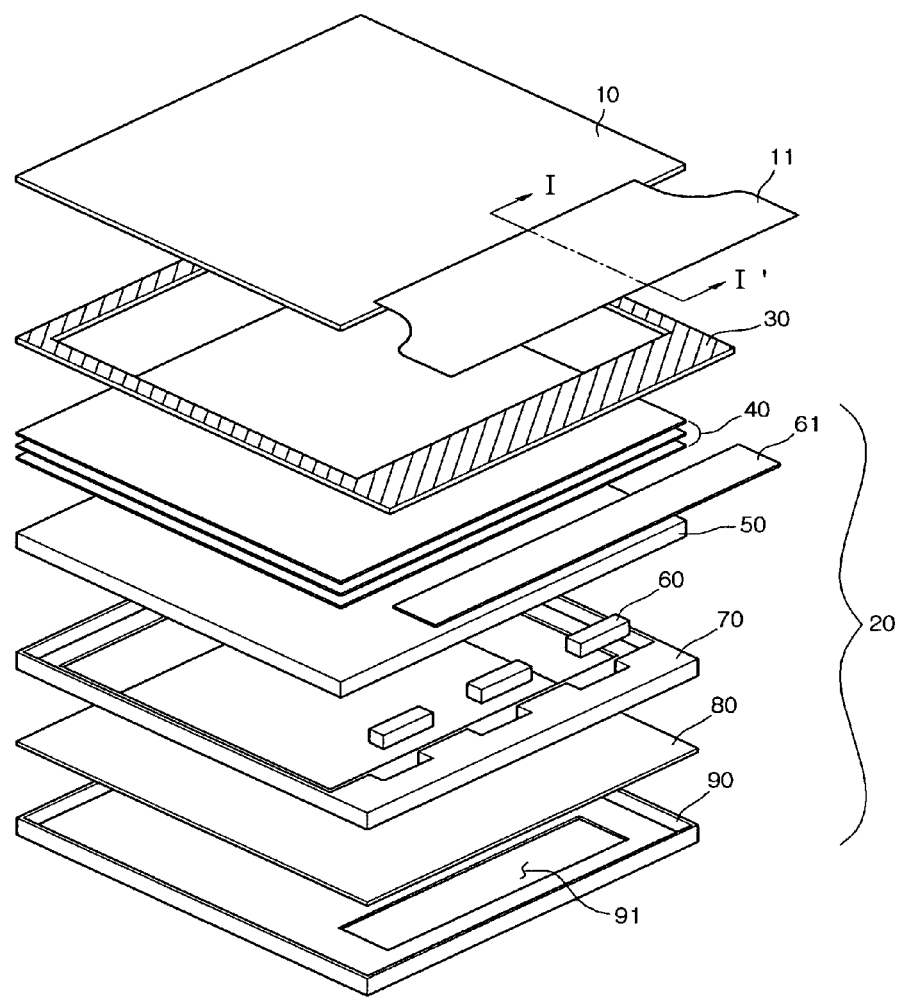
FIG. 1 is an exploded perspective view of a conventional small-sized liquid crystal display device.
Figure 2:
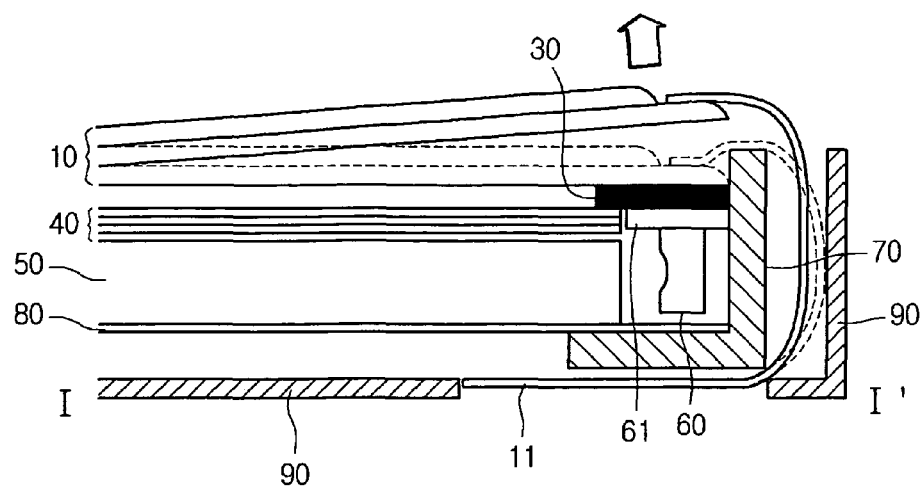
FIG. 2 is a cross-sectional view taken along line I-I' of FIG. 1.
Figure 3:
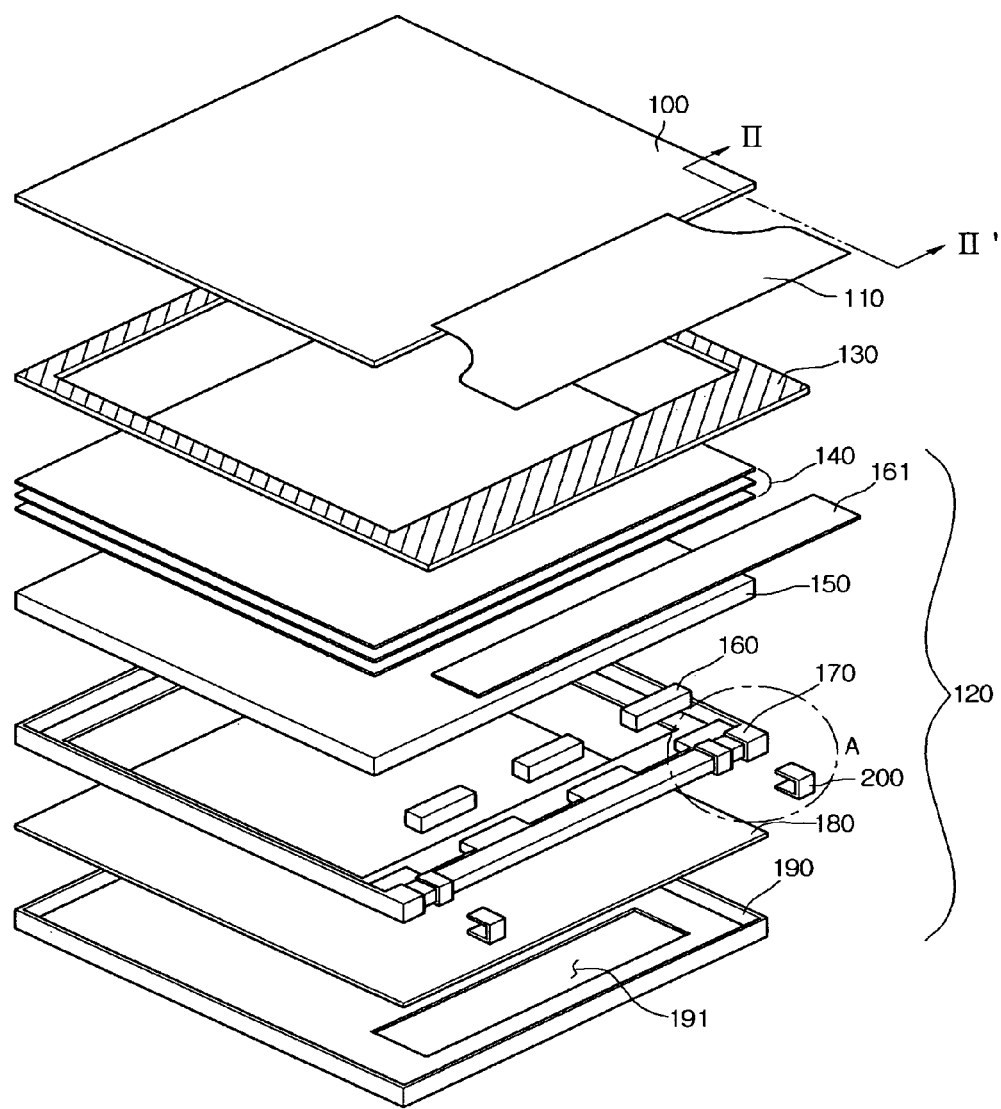
FIG. 3 is an exploded perspective view of a representative liquid crystal display device.
Figure 4:
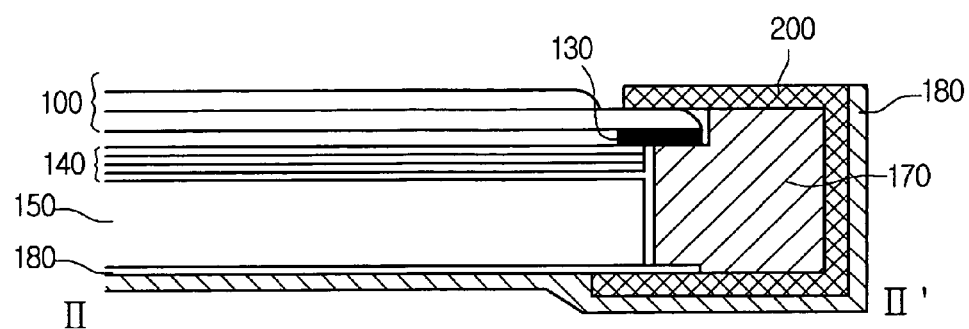
FIG. 4 is a cross-sectional view taken along line II-II' of FIG. 3.
Figure 5:
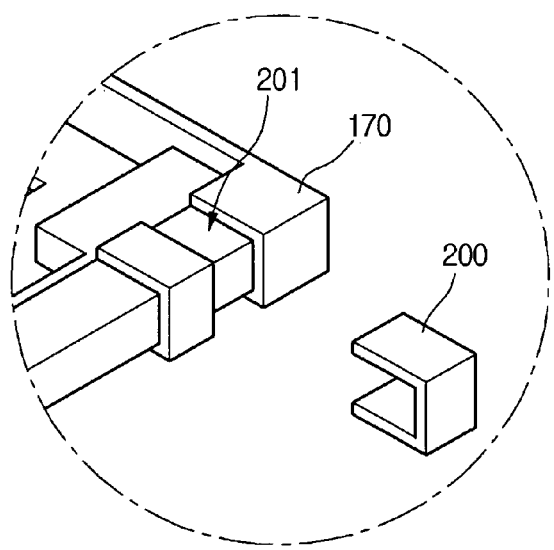
FIG. 5 is a detail view of part A of FIG. 3, showing a support main and a clip.
Figure 6:
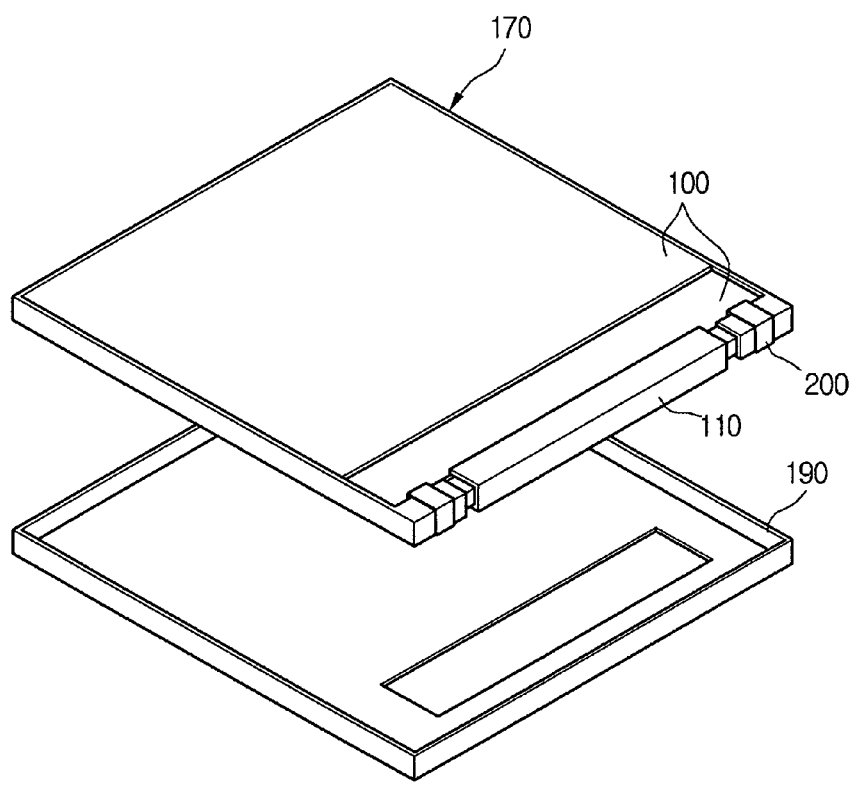
FIG. 6 is an exploded perspective view depicting an engaging process of a liquid crystal display device.

Hereinafter, preferred embodiments according to the present invention will be described with reference to the accompanying drawings.

As shown in FIGS. 3-6, the liquid crystal display device includes a liquid crystal panel 100 for displaying an image, an FPC 110 with a circuit for driving the liquid crystal panel mounted thereon, a back light assembly 120 that provides a flat surface light to illuminate the liquid crystal panel 100, and a light shielding tape 130 located between the liquid crystal panel 110 and the back light assembly 120. The liquid crystal panel 100 includes a thin film transistor array substrate and a color filter substrate that are adhered to each other. The thin film transistor array and the color filter substrate are arranged oppositely to each other to maintain a uniform cell gap. A liquid crystal layer is interposed between a thin film transistor array substrate and a color filter substrate.

The FPC 110 includes a flexible insulation film in which a conductive wire pattern for a complex circuit wire is provided and to which drive circuit chips are mounted thereto. The flexible insulation film may be made from heat resistant plastic films such as PET (polyester) or PI (polyimide). Because the flexible FPC 110 provides space for three-dimensional wiring, flexible FPCs 110 are widely used in many small-sized liquid crystal display devices.

The back light assembly 120 includes a plurality of light emitting diodes 160 that emit light disposed on one side of a light guide plate 150, a printed circuit board 161 that provides and applies the voltage required to drive the light emitting diode 160, and a plurality of optical sheets 140 that are disposed on the light guide plate 150 and collect and diffuse the light. A reflection plate 180 is disposed on the rear surface of the light guide plate 150 and reflects the light from the rear surface of the light guide plate 150 to the front surface of the light guide plate 150. The light guide plate 150 converts the light from the plurality of light emitting diodes 160 to the form the flat surface light that is directed toward the optical sheets 140.

A small-sized liquid crystal display device according to a preferred embodiment of the present invention includes a support main 170 that receives a plurality of light emitting diodes 160, a printed circuit board 161, a light guide plate 150, and a plurality of optical sheets 140 provided in a back light assembly 120. A bottom cover 190 is provided that may be formed with a box-like shape with an open upper surface. The support main 170 is fixed with a plurality of fasteners, such as screws, that penetrates the bottom cover 190. The support main 170 is received in the bottom cover 190.

A light shielding tape 130 is attached to the support main 170. The light shielding tape 130 substantially prevents light leakage from the liquid crystal display device by restricting the area irradiated through from a plurality of optical sheets toward a liquid crystal panel 100. The light shielding tape 130 may be dyed or coated with a black dye to effectively prevent light leakage from the device. In addition, the light shielding tape 130 fixes the plurality of light emitting diodes 160, the printed circuit board 161, the light guide plate 150, and the plurality of optical sheets 140 that are each disposed in the support main 170 to constrain and prevent movement of these components within the support main 170. Further, the light shielding tape 130 fixes the liquid crystal panel 100 in an upper portion thereof. The light shielding tape 130 may include adhesive layers provided on both surfaces thereof. Accordingly, the shielding tape 130 not only prevents light leakage from the LCD panel but also fixes the back light assembly 120 received in the support main 170 and the liquid crystal panel 100 to their respective components.

The small-sized liquid crystal display device according to the preferred embodiment of the present invention includes a plurality of clips 200 that are used to fix the components of the liquid crystal panel 100. The clips 200 are engaged with an edge of the side of the support main 170 in which an FPC 110 is located. Each of the clips 200 has a "⊏"-shaped or similarly shaped cross-section suitable for surrounding a portion of the edge of the support main 170. In other words, the clips 200 are shaped with three legs that are provided at substantially perpendicular angles to their neighboring legs and with the two opposite legs oriented substantially in parallel to each other. Each clip 200 has at least one rectangular surface. In some embodiments, all three legs of the clip 200 are rectangular.

One surface of each clip 200 surrounds a portion of the front surface of the support main 170 and has an extending end portion that covers the edge of the liquid crystal panel 100. Each of the clips 200 urge and fix the lower surface of the support main 170 and a surface of the liquid crystal panel 100 that surrounds an edge of the support main 170 together, such that the support main 170 covers the edge (i.e. the non-display area) of the liquid crystal panel 100. In order to sufficiently maintain the urging force between the support main 170 and the liquid crystal panel 100, each of the clips 200 can be formed from metal, and specifically a metal with a high elasticity and a high strength. Alternatively, the clips 200 may be formed from synthesized materials or the like.

A guide groove 201 is formed at an edge of the support main 170 and guides the engagement of the clip 200 and the support main 170. The guide groove 201 also prevents the clip 200 that is engaged with the support main 170 from being separated form the engagement position. The depth of the guide groove 201 corresponds to the thickness of the clip 200 and the shape of the guide groove 201 is similar to the "⊏"-shape of the clip 200. Accordingly, the outer surfaces of the clip 200 and the support main 170 are substantially planar when the clip 200 is installed. The guide groove 201 is formed by decreasing the circumference or the outer surfaces of a partial edge of the support main 170 by the thickness of the clip 200. Further, the guide groove 201 prevents outer dimensions of the liquid crystal display device from increasing by the thickness of the legs of the clip 200. The guide groove 201 can be simultaneously formed when the support main 170 is manufactured.

Although not shown in the figures, an adhesive layer may be provided on the inner wall surface of the clip 200 or a surface of the guide groove 201 to provide a strong and reliable joint between the clip 200 and the support main 170.

The assembling process of the liquid crystal display device is completed by firmly fixing the liquid crystal panel 100 and the support main 170 with the clip 200 and then engaging the bottom cover 190 and the support main 180. The number and size of the clip 200 can be changed according to the kind and size of the liquid crystal display device.

The liquid crystal panel 100 may be urged by and supported to the support main 170 by the "⊏"-shaped or similarly shaped clip 200 that is engaged along the guide groove 201 formed at the edge of the support main 170. The liquid crystal panel 100 receives a repulsive force by the FPC 110 is prevented from being raised or bent from the support main 170, which prevents light leakage from the liquid crystal display device. Further, since the clip 200 firmly fixes the liquid crystal panel 100 to the support main 170, damage to the device, such as a crack, is not generated in the liquid crystal panel 100 and the back light assembly 120 even when the liquid crystal panel 100 receives an external impact, such as during an impact test. Accordingly, the defect rate of the liquid crystal display device is reduced.

Figure 7:
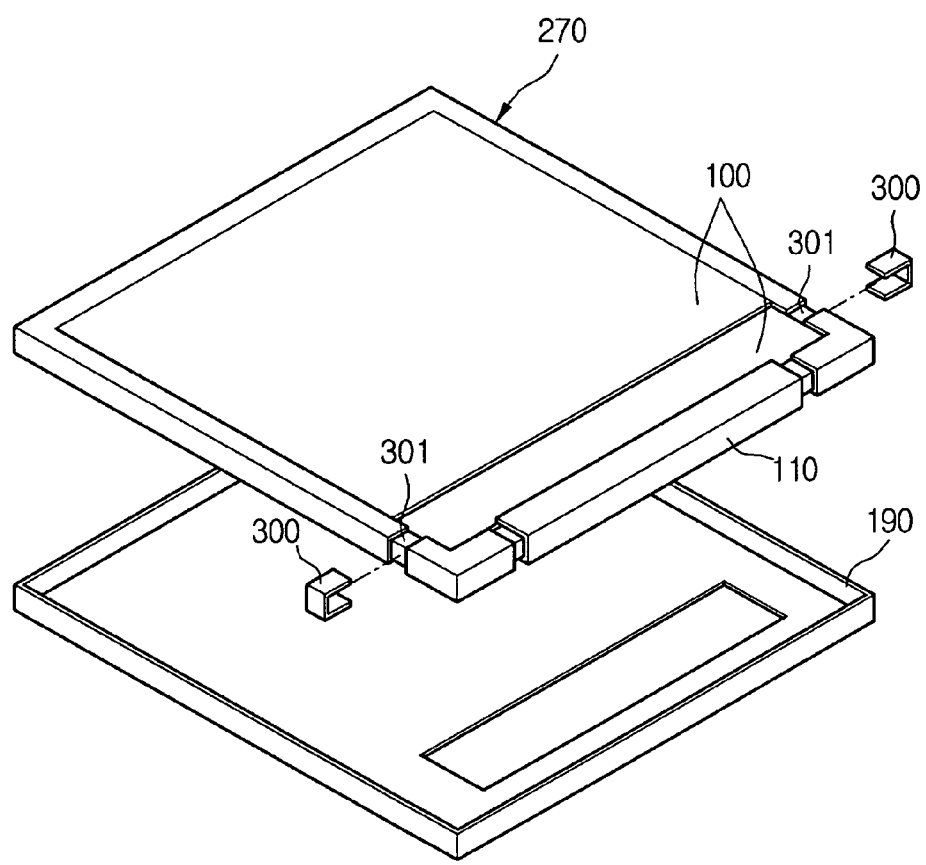
FIG. 7 is an exploded perspective view depicting another representative liquid crystal display device.

FIG. 7 is an exploded perspective view depicting a liquid crystal display device according to another representative embodiment. The liquid crystal display device shown in FIG. 7 has the same structure as the liquid crystal display device shown in FIG. 6, except that a support main 270 has guide grooves 301 formed on the edges that are perpendicular to an edge on the support main 270 at which the FPC 110 is located. Clips 300 have a "⊏"-shaped or a similarly shaped cross-section and are engaged with the guide grooves 301. The clips 300 in FIG. 7 are engaged along the guide grooves 301 that are on edge areas of the support main and urges an edge (i.e. a non-display area) of the liquid crystal panel 100 toward the support main 170.

When the clip 300 is provided on respective guide grooves 301 defined on the support main 270, the liquid crystal panel 100 is firmly fixed to the support main 270. Accordingly, when the liquid crystal panel 100 receives a repulsive force, the FPC 110 is prevented from being raised or otherwise deflected by the support main 270, preventing light leakage from the liquid crystal display device because the FPC 110 is stably provided on the support main 270. Further, cracks and other types of damage are not generated in the liquid crystal panel 100 and the back light assembly 120 even in cases of external impacts on the LCD, such as during an impact test. As a result, the liquid crystal display device according to the present invention minimizes the defect rate.

Figure 8:
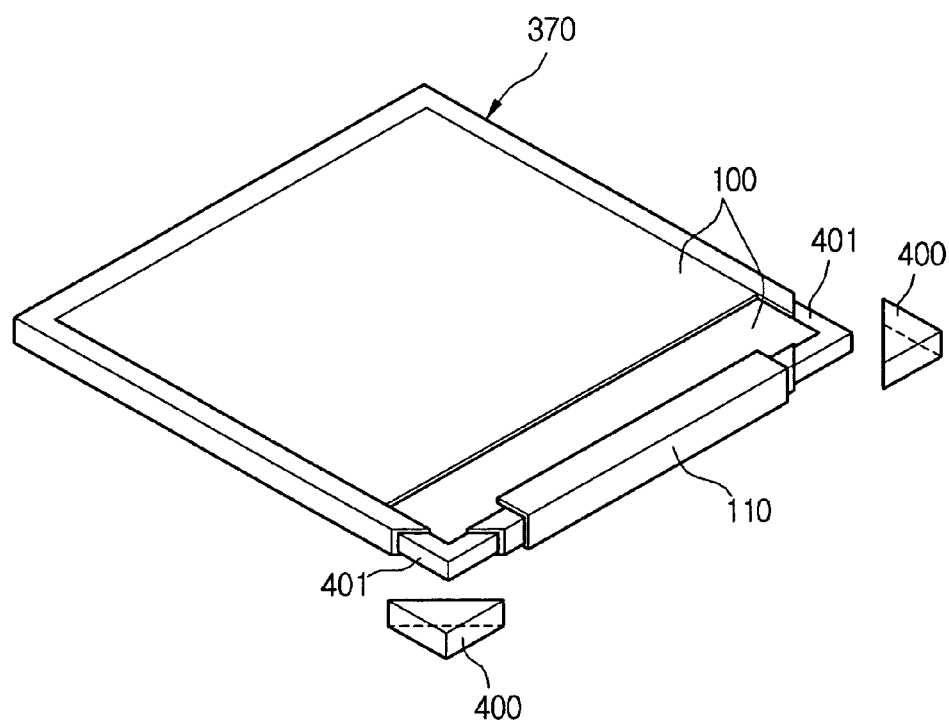
FIG. 8 is an exploded perspective view depicting another representative a liquid crystal display device.

FIG. 8 is an exploded perspective view for explaining a liquid crystal display device according to another preferred embodiment. The liquid crystal display device shown in FIG. 8 has the same structure as the liquid crystal display device shown in FIG. 6, except that a support main 370 has guide grooves 401 formed at the corners on both ends of the side upon which the FPC 110 is located. The clips 400 have a "⊏"-shaped or similarly shaped cross-section, are formed with a triangular outer shape, and are engaged with the guide grooves 401. The clips 400 in FIG. 8 are engaged along the guide grooves 401 that are formed at corner areas of the support main 370. The clips 400 align the corner portion (i.e. the non-display area) of the liquid crystal panel 100 and the support main 370.

The liquid crystal panel 100 is firmly fixed to the support main 370 on the triangular clip 400. Accordingly, if the liquid crystal panel 100 receives a repulsive force on the FPC 110, the FPC 110 is prevented from being raised by the support main 370, which prevents light leakage from the liquid crystal display panel. Further, cracks and other types of damage are not formed in the liquid crystal panel 100 and the back light assembly 120 even when presented with impacts such as during an impact test. As a result, the liquid crystal display device according to the present invention minimizes the defect rate.

Although the present disclosure has been described by the three preferred embodiments shown in the figures, it would be appreciated that various modifications and variations can be made by those skilled in the art without departing the sprit of the disclosure. Therefore, the scope of the disclosure is not limited by the description in the specification but is defined by the claims.

What is claimed is:

1. A liquid crystal display device comprising:
   a support main receiving a back light assembly and having a guide groove to engage with a fixation member;
   a liquid crystal panel positioned in the support main having the guide groove and located on the back light assembly, the liquid crystal panel having an upper surface and a lower surface, the lower surface facing the back light assembly;
   a wire film extending from the liquid crystal display panel and surrounding an edge of the support main; and
   a fixation member engaged on a side of the support main at which the wire film is located to fix the liquid crystal panel with respect to the support main,
   wherein the guide groove is formed at a portion of the support main at which the fixation member is engaged and has substantially the same shape as the fixation member,
   wherein the fixation member has an extending end portion that covers the edge of the liquid crystal panel,
   wherein the extending end portion of the fixation member is contacted to an upper surface of the edge of the liquid crystal panel,
   wherein the fixation member has a triangular shape, and
   wherein the fixation member is engaged to at least one corner on an edge of the side of the support main.

2. A liquid crystal display device according to claim 1, wherein the fixation member comprises an adhesive layer coated on an inner wall surface thereof.

3. A liquid crystal display device according to claim 1, wherein the fixation member is a high strength metal.

4. A liquid crystal display device according to claim 1, wherein the support main comprises an adhesive layer coated on a surface of the guide groove.

5. The liquid crystal display device according to claim 1, wherein the support main comprises a plurality of guide grooves for receiving a similar plurality of fixation members.

* * * * *